US009999959B2

(12) United States Patent
Evans et al.

(10) Patent No.: US 9,999,959 B2
(45) Date of Patent: Jun. 19, 2018

(54) SUPPORT PAD FOR A DRILL HEAD AND METHOD FOR DESIGNING AND MANUFACTURING A SUPPORT PAD

(71) Applicant: SANDVIK INTELLECTUAL PROPERTY AB, Sandviken (SE)

(72) Inventors: Tony Evans, Wotton-under-Edge (GB); Simon Lawes, Dursley (GB)

(73) Assignee: SANDVIK INTELLECTUAL PROPERTY AB, Sandviken (SE)

(*) Notice: Subject to any disclaimer, the term of this patent is extended or adjusted under 35 U.S.C. 154(b) by 133 days.

(21) Appl. No.: 15/238,788

(22) Filed: Aug. 17, 2016

(65) Prior Publication Data

US 2016/0361794 A1 Dec. 15, 2016

Related U.S. Application Data

(62) Division of application No. 13/970,849, filed on Aug. 20, 2013.

(30) Foreign Application Priority Data

Aug. 22, 2012 (EP) ..................................... 12181352

(51) Int. Cl.
*B24B 51/00* (2006.01)
*B23B 51/04* (2006.01)
(Continued)

(52) U.S. Cl.
CPC .............. *B24B 51/00* (2013.01); *B23B 51/04* (2013.01); *B23B 51/048* (2013.01); *B24B 9/00* (2013.01);
(Continued)

(58) Field of Classification Search
CPC ....... B24B 51/00; B23B 51/048; B23B 51/04; B23B 2251/56; B23B 2251/422; B23B 2229/04
(Continued)

(56) References Cited

U.S. PATENT DOCUMENTS 3,910,159 A * 10/1975 Gladwin ................... B23C 3/13
409/199
4,061,077 A * 12/1977 Gladwin ................... B23C 3/16
409/199
(Continued)

FOREIGN PATENT DOCUMENTS

CN 101758273 A 6/2010
CN 102528129 A 7/2012
(Continued)

*Primary Examiner* — George Nguyen
(74) *Attorney, Agent, or Firm* — Corinne R. Gorski

(57) ABSTRACT

A deep hole drill head support pad whose edge chamfers are formed in a continuous grinding operation so that there are no discontinuities in the angled side surface leading up to the outer surface thereof. A method of manufacturing the support pad includes generating a virtual guide metric including a curved travel path for a grinding surface around a support pad blank, and a plurality of control surfaces intersecting with the curved path at separate locations along its length, each control surface defining an angle of orientation of the grinding surface. A CNC grinding machine can interpret the virtual guide metric to change the angle of orientation of a grinding surface relative to a support pad blank as it moves between adjacent control surfaces in a continuous manner.

8 Claims, 4 Drawing Sheets

(51) Int. Cl.
*B24B 9/00* (2006.01)
*B24B 9/02* (2006.01)
*G05B 19/402* (2006.01)
*G05B 19/4093* (2006.01)

(52) U.S. Cl.
CPC .............. *B24B 9/02* (2013.01); *G05B 19/402* (2013.01); *G05B 19/40938* (2013.01); *B23B 2222/28* (2013.01); *B23B 2251/422* (2013.01); *B23B 2251/56* (2013.01); *G05B 2219/2627* (2013.01); *Y10T 408/5586* (2015.01)

(58) Field of Classification Search
USPC ............................................ 451/5, 8–10, 43
See application file for complete search history.

(56) References Cited

U.S. PATENT DOCUMENTS

| | | | |
|---|---|---|---|
| 5,503,589 A | 4/1996 | Wikle | |
| 6,375,284 B1 * | 4/2002 | Frank | A47B 47/00 312/140 |
| 6,682,275 B1 | 1/2004 | Lindblom et al. | |
| 2010/0158623 A1 | 6/2010 | Danielsson | |
| 2012/0134759 A1 | 5/2012 | Jaeger | |
| 2012/0220194 A1 * | 8/2012 | Maloney | B24B 27/0038 451/5 |
| 2013/0084780 A1 * | 4/2013 | Lancaster-Larocque | B24B 49/12 451/5 |
| 2013/0102227 A1 * | 4/2013 | Walsh | B24B 37/013 451/11 |
| 2014/0087628 A1 * | 3/2014 | Bharadwaj | B24B 19/26 451/5 |
| 2014/0113525 A1 * | 4/2014 | Chan | G05B 19/19 451/5 |

FOREIGN PATENT DOCUMENTS

| | | |
|---|---|---|
| EP | 0520936 A1 | 6/1992 |
| EP | 2090391 A1 | 8/2009 |
| GB | 2175517 A | 12/1986 |
| JP | 2003502163 A | 1/2003 |
| JP | 03202207 A | 7/2003 |
| JP | 2005182437 A | 7/2005 |
| JP | 2006239827 A | 9/2006 |
| JP | 2007272706 A | 10/2007 |
| JP | 2010142949 A | 7/2010 |
| JP | 2010228306 A | 10/2010 |
| JP | 4768998 B2 | 9/2011 |

* cited by examiner

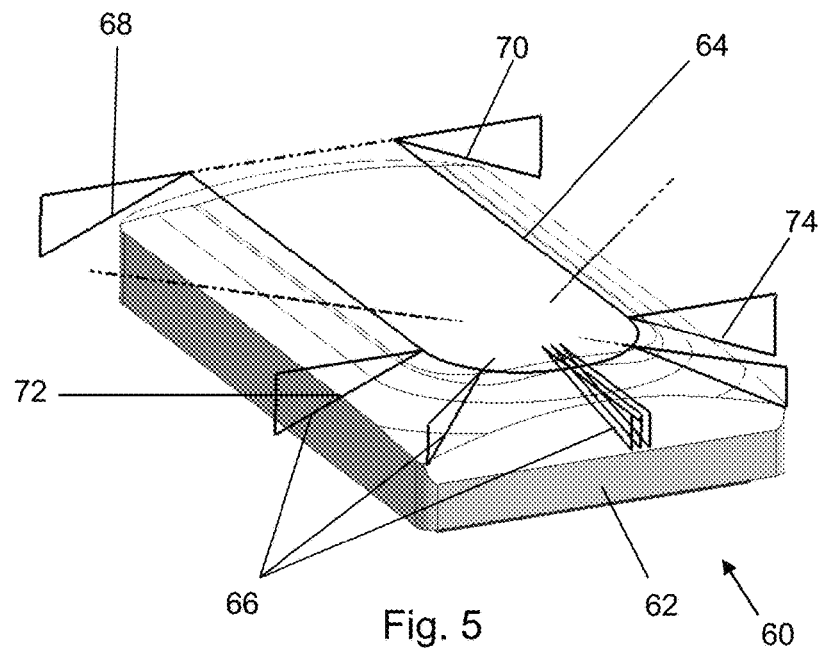
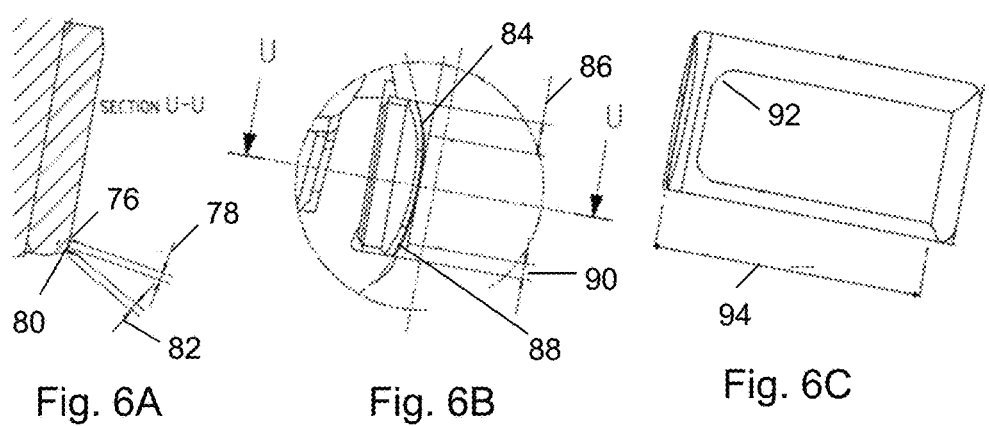

SUPPORT PAD FOR A DRILL HEAD AND METHOD FOR DESIGNING AND MANUFACTURING A SUPPORT PAD

RELATED APPLICATION DATA

This application is a divisional of U.S. patent application Ser. No. 13/970,849 filed Aug. 20, 2013 that claims priority under 35 U.S.C. § 119 to EP Patent Application No. 12181352.1, filed on Aug. 22, 2012, which the entirety thereof is incorporated herein by reference.

FIELD OF THE INVENTION

The invention relates to grinding surface profiles of metal objects. In particular, the invention relates to the shape and manufacture of support pads for drill heads intended for deep hole drilling, i.e. for machining a hole having a depth of more than 4 times its diameter in a workpiece of metal.

BACKGROUND TO THE INVENTION

Deep hole drilling is typically performed with drill heads which are not self-centering. Conventional drill heads for deep hole drilling, e.g. using the single tube system (STS) or Ejector system techniques are made with asymmetrically placed cutting inserts. Such drill heads comprise, at their front end, an outer cutting insert, a inner cutting insert and an intermediate cutting insert. The inner and outer cutting inserts are located adjacent to a first chip inlet port and the intermediate cutting insert is located adjacent to a second chip inlet port, which is diametrically opposite the first chip inlet port.

A pair of support pads (also known as guide pads) are mounted on the periphery of the drill head at its front end. Each support pad presents a radially projecting surface. These projecting surfaces are intended to abut against a hole wall generated by the outer cutting insert. Together with the outer cutting insert, the support pads provide a three point contact to centre the drill head in the hole. The support pads and outer cutting insert may thus be spaced from each other around the periphery of the drill head.

Examples of long hole drills having such support pads are disclosed for example in U.S. Pat. No. 5,697,737, U.S. Pat. No. 6,602,028 and U.S. Pat. No. 6,682,275.

Conventional support pads are formed as separate objects, e.g. from a hard-wearing material, such as cemented carbide, which are then secured to the drill head, e.g. by brazing or by means of a screw. The supports pads each have a generally cuboidal shape, but where the outer surface (i.e. the surface facing radially away from the drill head to contact the hole wall) is convex, i.e. describes a convex arch across the width of the support pad, which is in a circumferential direction of the drill head. The radially projecting surface presented by the support pad may taper along the length of the support pad away from the front end of the drill head, i.e. so that the maximum radial projection is at the front edge of the support pad.

Chamfers are formed at the edges of the support pad to provide a smooth transition to the outer surface. A known disadvantage of the chamfers is that their lines of intersection (typically at the corners of the support pad) can be sharp and therefore prone to act as additional cutting surfaces. This can result in poor quality holes, seen as spirals, ribbing, oversize and score lines on retraction, and can also reduce the useful working like of the support pad or drill head and can negatively affect the surface speed of the drill head in use.

Various attempts have been made to address this disadvantage. For example, it is possible to hone the intersections by hand uses a diamond file or lap. However, by its nature this method is labor intensive and hard to control from a viewpoint of consistency and repeatability. Others have attempted to blend the intersection using additional conventional machine grinding steps. However, the use of additional grinding steps inevitably generating further intersections, since there must be clearance for lead in and lead off of the grinding surface.

US 2010/0158623 discloses the use of a bespoke grinding step using a conical grinding surface to effectively provide an additional arcing chamfer along the intersection between the front end chamfer and the outer surface of the support pad. However, even in this case further intersections are formed where the additional chamber intersects the side chamfers.

SUMMARY OF THE INVENTION

At its most general, the present invention provides a deep hole drill head support pad whose edge chamfers are formed in a continuous grinding operation so that there are no discontinuities in the angled side surface leading up to the outer (i.e. contact) surface of the support pad. This is particular advantageous for the corner of the support pad between its leading side surface and its front surface, since this is where the frictional force can be particularly high.

According to a first aspect of the invention, there is provided a support pad for a drill head of a deep hole drilling machine, the support pad having: a outer surface for contacting a work piece to be drilled, the outer surface describing a convex arch between opposite side edges thereof; an inner surface opposite the outer surface; a leading side surface between the inner and outer surfaces along a first side of the support pad; a trailing side surface between the inner and outer surface along a second side of the support pad opposite the first side; a front surface for locating at the distal end of the drill head, the front surface being between the inner and outer surfaces at a first end of the leading and trailing side surfaces; a rear surface between the inner and outer surfaces at a second end of the leading and trailing side surfaces opposite the first end; a leading side chamfer between the outer surface and the leading side surface, the leading side chamfer being oriented at a first angle with respect to the outer surface along a leading side edge of the outer surface; and a chamfered entering surface between the outer surface and the front surface, the chamfered entering surface being oriented at a second angle with respect to the outer surface along a front edge of the outer surface, wherein the leading side chamfer joins the chamfered entering surface via a leading transition region whose orientation relative to the outer surface changes from the first angle to the second angle without discontinuity. The absence of discontinuity may correspond to a smoothly contoured surface without any observable lines of intersection between planar surfaces. According there are no sharp edges at which frictional forces can become concentrated.

The support pad structure defined above may provide a number of advantages. The absence of lines of intersection between differently oriented planar surface reduces the friction force on the support pad. In turn this can reduce the torsional load on the drill head, which helps to avoid vibration thereby improving the quality of the holes. In addition, the working lifetime of the support pad may be increased, which in turn increases the productivity of the drill head as a whole.

Preferably, the leading side chamfer, leading transition region and chamfered entering surface are formed in a single machine grinding operation. The method by which this can be achieved is set out in detail below. Forming the surface in a single operation can be more efficient and repeatable than the known hand honing technique mentioned above. It may facilitate efficient industrial scale manufacture of the support pad.

The support pad may include a trailing side chamfer between the outer surface and the trailing side surface, the trailing side chamfer being oriented at a third angle with respect to the outer surface along a trailing side edge of the outer surface, wherein the chamfered entering surface joins the trailing side chamfer via a trailing transition region whose orientation relative to the outer surface changes from the second angle to the third angle without discontinuity. In other words, the same technique can be used on the transition between the chamfered entering surface and the trailing side chamfer as between the chamfered entering surface and the leading side chamfer, i.e. the chamfered entering surface, trailing transition region and trailing side chamfer can be formed in a single machine grinding operation.

In practice it is desirable to have a leading edge chamfer, a chamfered entering surface and a trailing edge chamfer. Preferably all three of these chamfers and the leading transition region and trailing transition region are formed in a single grinding step with no discontinuities.

The first angle may vary along the leading side chamfer. Any variation is preferably in a continuous manner to avoid the formation of sharp intersections, i.e. discontinuities in the angled surface. Similarly, the second angle may vary along the chamfered entering surface and/or the third angle may vary along the trailing side chamfer. Again, any variation is preferably continuous for the same reasons.

In one embodiment, a recessed portion may be formed substantially centrally in the leading edge of the outer surface. The chamfered entering surface may thus include an smoothly indented portion corresponding to the recessed portion. The centre of the leading edge of the outer surface is often the location at which the greatest friction forces are exerted. Degradation or breakdown of the support pad is common at this location. The recessed portion aims to spread the frictional forces to increase the lifetime of the support pad. Altering the geometry of the leading edge of the outer surface was undesirable and in some cases impossible with the conventional support pad manufacturing technique.

A second aspect of the invention provides a method for manufacturing a support pad as discussed above. Support pads are conventionally manufactured as cast blanks of material whose final shape is finished in a computer numerical control (CNC) grinding machine, such as the TX7+ universal grinder manufactured by ANCA Pty. Ltd., as part of a computer-aided manufacturing (CAM) process. Conventionally, the support pad geometry is created using a computer-aided design (CAD) software package. The normal CAM process includes generating instructions (e.g. G-code) to drive the CNC grinding machine from the CAD representation of the support pad. However, the present inventors identified a problem with this technique, which was that it was extremely difficult to express mathematically within a CAD drawings a smoothly contoured chamfered surface around the leading side surface and front surface of a support pad blank. There was thus an apparent barrier to manufacturing the desired surface profile, since until it could be expressed mathematically, the relevant instructions to drive the CNC grinding machine could not be extracted. Moreover, it appeared that a separate mathematical expression would be required for each particular geometry, which would be a burden on manufacture.

The inventors devised a solution to this problem by bypassing the complete CAD representation of the support pad. They realised that the CNC machine itself was capable of executing a continuous change in position of the grinding surface relative to the support pad blank, when provided with a start and stop orientation. Thus, the inventors realised that if the support pad geometry could be expressed as a skeleton of fixed orientations for the grinding surface, the CNC grinding machine itself would provide the smooth transitions. Mathematical expressions of those transition thereof did not need to be derived in advance.

Thus, according to the second aspect of the invention, there is provided a method of manufacturing a support pad for the drill head of a deep hole drilling machine, the method comprising: generating a virtual guide metric comprising: a curved path for defining the direction of travel of a grinding surface around a leading side surface and front surface of a support pad blank; a plurality of control surfaces intersecting with the path at separate discrete locations along its length, each control surface defining an angle of orientation of the grinding surface at each discrete location on the path; and instructing a computer numerical control (CNC) grinding machine to associate the virtual guide metric with a support pad blank held in a workpiece holder of the CNC grinding machine; causing relative movement between a grinding surface of the CNC grinding machine and the support pad blank held in the workpiece holder according to the virtual guide metric; and during the relative movement, changing the angle of orientation of the grinding surface between adjacent control surfaces in a continuous manner. Thus, according to the method of the invention, the virtual guide metric provides in combination a path of movement for the grinding surface relative to the support pad blank and a set of positions for the grinding surface on its way around the path. In interpreting the virtual guide metric, the CNC grinding machine determines the movement of the grinding surface between each adjacent position. A particular advantage of this technique is that a virtual guide metric may defined by a set of parameters, so that different geometries can be generated simply by entering a new set of parameters, rather than generating a entirely new shape.

Thus, the virtual guide metric may include an plurality of parameters stored in a computer memory, the parameters defining properties of the curved path and control surfaces. The method may include, before generating the virtual guide metric, inputting one or more of the plurality of parameters into the computer memory. For example, the curved path of the virtual guide metric may comprise a U-shaped path for forming a single chamfered surface around a leading side surface, a front surface and a trailing surface of the support pad blank. The U-shaped path may be defined by a first set of parameters, e.g. width, length, radius of leading corner, radius of trailing corner, which may correspond to the support pad blank intended for use. The plurality of parameters may include any one or more of: a primary lead angle for defining the angle of orientation of the grinding surface along a central portion of the entering surface of the support pad blank; a primary lead width for defining the width of the chamfer along the central portion of the entering surface; a secondary lead angle for defining the angle of orientation of the grinding surface along the entering surface on each side of the central portion; a secondary lead width for defining the width of the chamfer along the entering surface on each side of the central portion; a pad leading side angle for defining the angle of orientation of the grinding surface along the leading side surface of the support pad blank; a pad leading side angle width for defining the width of the chamfer along the leading side surface of the support pad blank; a pad trailing side angle for defining the angle of orientation of the grinding surface along the trailing side surface of the support pad blank; a pad trailing side angle width for defining the width of the chamfer along the leading side surface of the support pad blank; and a blend radius for defining the radius of curvature of the curved path between a leading edge portion and an entering surface portion.

As described above, the support pad blank may include a outer surface describing a convex arch between opposite side edges thereof. In this case, the curved path may include an arched portion for following the shape of the outer surface at its leading edge. The radius of the arch may be a further parameter of the virtual guide metric. As mentioned above, it may be desirable to provide a recessed portion in the front edge of the outer surface. This can be done by providing a suitable indent in the U-shaped path. The depth and radius of the indent may be parameters of the U-shaped path.

The way in which the CNC grinding machine is arranged (e.g. programmed) to change the angle of orientation between adjacent control surfaces may be preset in the CNC grinding machine or programmed in separately before the virtual guide metric is input. Thus, the step of changing the angle of orientation of the grinding surface may include varying the angle of orientation as the grinding surface travels along the distance x between terminal end points of adjacent control surfaces according to a continuous function φ(x), where $$\frac{d\phi}{dx} = 0$$

at each terminal end point. The distance x may be along a curved pathway, e.g. around the leading or trailing corner of the support pad blank. The CNC grinding machine may continuous function φ(x) using the conditions and/or boundary conditions provided by the terminal end points of the control surfaces and the corresponding derivatives.

In practice, the virtual guide metric may be defined in a CAD environment, e.g. in relation to a representation of a support pad blank. For example, the U-shaped path and the control surfaces may effectively define a profile suspended above (i.e. vertically spaced from) the representation of the support pad blank. It may be possible to mimic the outcome of the grinding operation by performing a Boolean operation using the suspended profile and the support pad blank, to provide a virtual view of the ground surface.

The second aspect of the invention may have applicable outside the field of deep hole drilling. It may be useful in any situation where a smoothly contour surface needs to be machined on to an object. Thus, the second aspect of the invention may be expressed as a method of applying a surface profile to an object, the method comprising: generating a virtual guide metric comprising: a path for defining the direction of travel of a grinding surface along the perimeter of the object; a plurality of control surfaces intersecting with the path at separate discrete locations along its length, each control surface defining an angle of orientation of the grinding surface at each discrete location on the path; and instructing a computer numerical control (CNC) grinding machine to associate the virtual guide metric with the object when held in a workpiece holder of the CNC grinding machine; causing relative movement between a grinding surface of the CNC grinding machine and the object held in the workpiece holder according to the virtual guide metric; and during the relative movement, changing the angle of orientation of the grinding surface between adjacent control surfaces in a continuous manner.

Embodiments of the invention are discussed in detail below with reference to the accompanying drawings, in which:

BRIEF DESCRIPTION OF THE DRAWINGS

FIG. 5 is a perspective schematic view of a virtual guide metric suitable for use in a method that is an embodiment of the invention;

FIGS. 6A, 6B and 6C are a series of views of a support pad of the invention in which parameters for the virtual guide metric are depicted;

DETAILED DESCRIPTION

Figure 1:
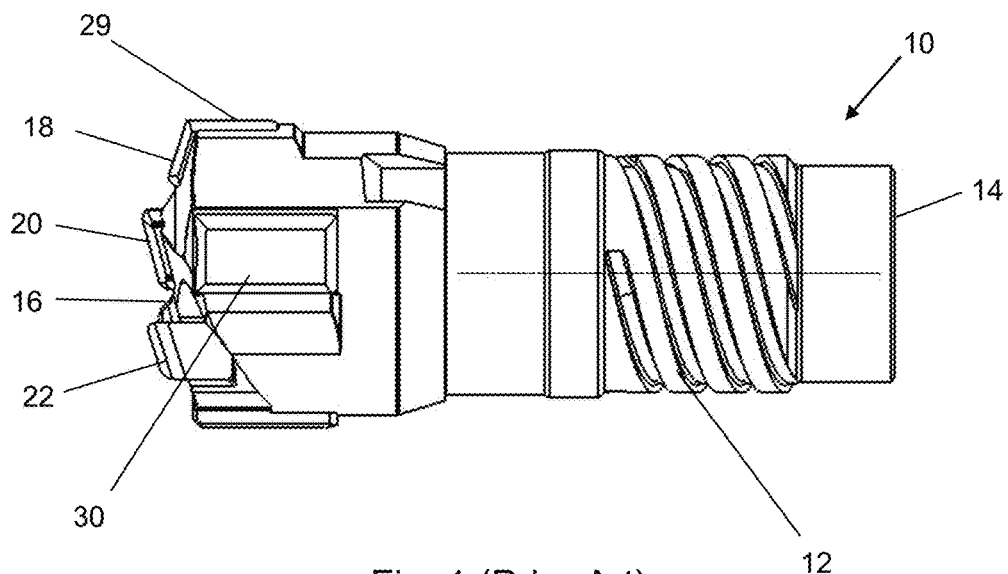
FIG. 1 is a side view of a conventional deep hole drill head.
Figure 2:
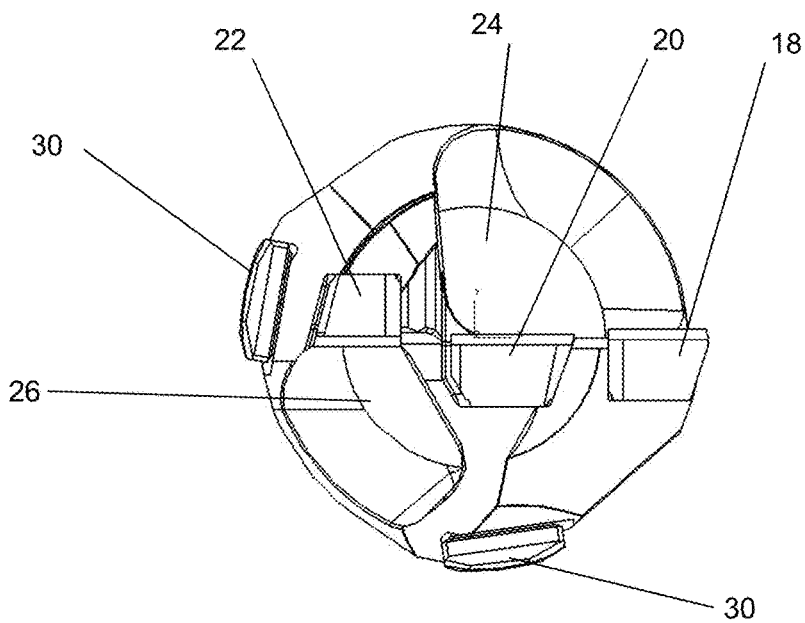
FIG. 2 is a front view of the conventional deep hole drill head shown in FIG. 1.

FIGS. 1 and 2 show a conventional drill head 10 for a deep hole drilling machine. The support pad of the invention is suitable for use with drill heads of this type. The drill head 10 comprises a hollow, generally cylindrical body having a rear end 14 (proximal to the drilling machine) and a front end 16 (distal to the drilling machine). In use, the drill head 10 is mounted on a drill tube (not shown). A male thread 12 on the rear end 14 of the drill head 10 is arranged to mate with a corresponding female thread formed in the drill tube.

As shown more clearly in FIG. 2, the front end 16 has three asymmetrically arranged cutting inserts 18, 20, 22 mounted therein. The cutting inserts include an outer cutting insert 18 mounted at the periphery of the drill head 10, an inner cutting insert 20 mounted towards the centre of the drill head 10, and an intermediate cutting insert 22 whose radial distance from drill head axis is between the inner and outer cutting inserts, but which is circumferentially spaced from the inner and outer cutting inserts 18, 20. The inner and outer cutting inserts 18, 20 are located along a common radius adjacent to a first chip inlet port 24. The intermediate cutting insert 22 is located adjacent to a second chip inlet port 26, which is diametrically opposite the first chip inlet port 24.

The outer cutting insert 26 provides a radially projecting part 29 (seen most clearly in FIG. 1) which contacts the hole wall generated during cutting. A pair of support pads 30 are mounted on the periphery of the drill head 10 at its front end. Each support pad 30 presents a radially projecting surface which also abut against the hole wall generated by the outer cutting insert. Together with the outer cutting insert 18, the support pads 30 thus provide a three point contact to centre the drill head in the hole. The support pads and outer cutting insert are spaced roughly equally around the periphery of the drill head 10, although other angular arrangements are possible.

Figure 3:
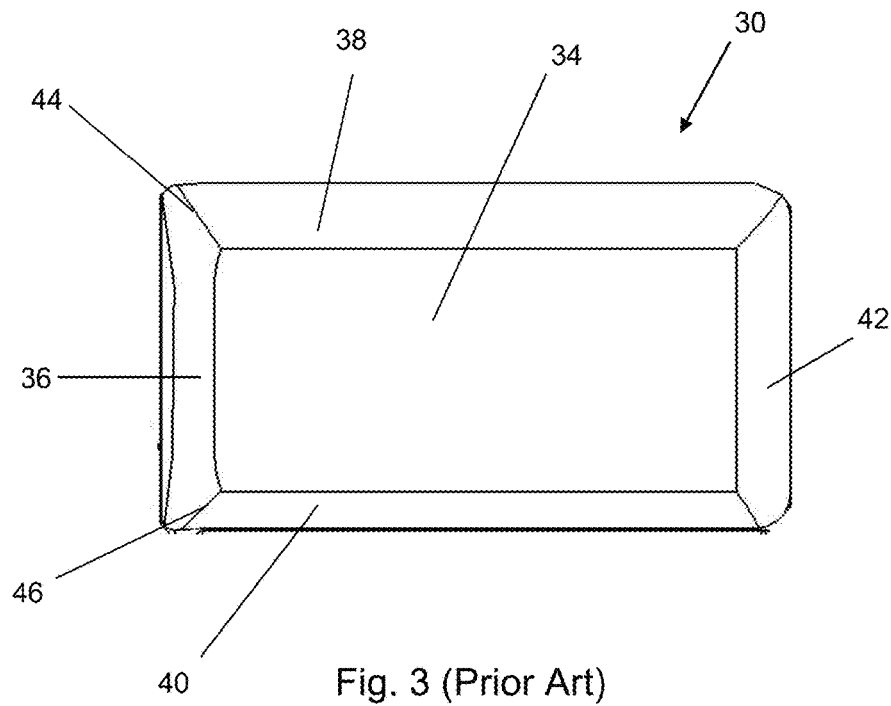
FIG. 3 is a top view of a conventional support pad.

FIG. 3 shows one of the support pad 30 in more detail. The support pad 30 is mounted in a pocket 32 formed in the side surface of the drill head 10. The support pad 30 may be fixed in the pocket 32 by soldering. The support pad 30 has a convexly arched outer surface 34. This is the surface that faces towards the hole wall. The outer surface 34 may taper slightly in the radial direction as the support pad extends away from the front end of the drill head. The tapering may be caused by the shape of the support pad 30 itself, or may be caused by a gradually conical tapering in the wall of the drill head itself. The front edge of the outer surface 34 terminates at a chamfered entering surface 36. Similarly the leading side edge and trailing side edge of the outer surface 34 terminate at a leading edge chamfer 38 and a trailing edge chamfer 40 respectively. There is also a rear edge chamfer 42 at rear end of the outer surface 34. It can be seen in FIG. 3 that the chamfered entering surface 36 meets the leading edge chamfer 38 and trailing edge chamfer 40 at distinct lines of intersection 44, 46. Similar lines of intersection occur at where the leading edge chamfer 38 and trailing edge chamfer 40 meet the rear edge chamfer 42. The lines of intersection 44, 46 are discontinuities in the angle of the surface around the edge of the outer surface 34. As explained above, these lines of intersection 44, 46 are sharp enough to act as cutting edges as the drill head is moved into and out of the drilled hole, which can lead to degradation of the hole.

Figure 4:
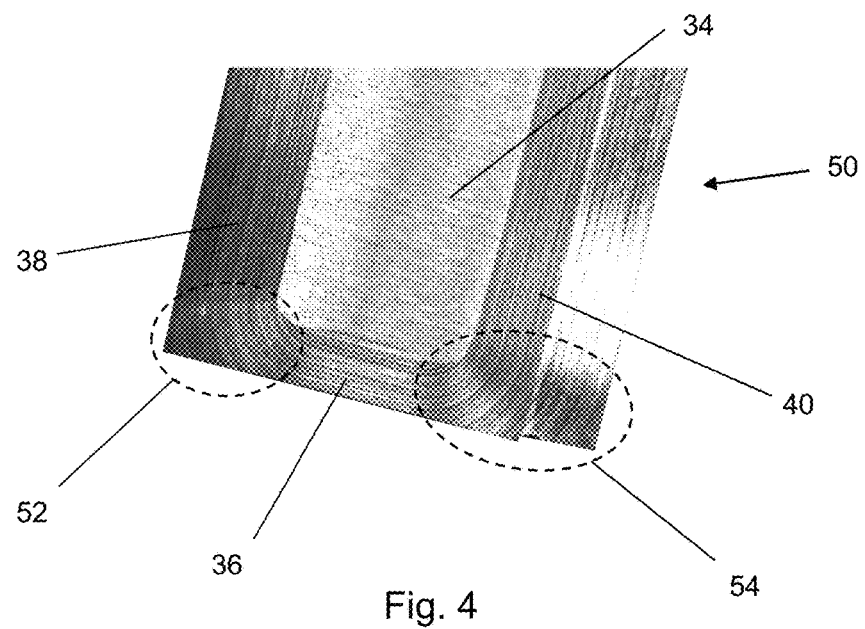
FIG. 4 is a photograph showing a top view of the front end of a support pad that is an embodiment of the invention.

The present invention provides a support pad and corresponding manufacturing method in which the lines of intersection are not present. FIG. 4 shows a top view of a support pad 50 that is an embodiment of the invention. The support pad is characterised by a continuous chamfer around the leading side edge and front end of the support pad, which also continues around to the trailing side edge without any discontinuity in angle. Similarly to the conventional support pad 30 shown in FIG. 3, the support pad 50 of the invention includes a chamfered entering surface 36, a leading edge chamfer 38 and a trailing edge chamfer 40 formed at the front edge, leading edge and trailing edge of the convexly arched outer surface 34 respectively. The difference from the conventional support pad is that instead of the lines of intersection, the support pad 50 includes a leading transition region 52 and a trailing transition region 54. The leading transition region 52 comprises an angled surface which extends without discontinuity from the leading side chamfer 38 to the chamfered entering surface 36. Similarly, the trailing transition region 54 comprises an angled surface which extends without discontinuity from the chamfered entering surface 36 to the trailing side chamfer 38. Without discontinuity means that the angle subtended by the chamfered surface relative to a notional cylindrical surface corresponding to the drill head body varies in a continuous manner.

The chamfered surfaces discussed above are generated by moving a grinding element, which defines a planar grinding surface, relative to a support pad blank. The support pad blank may be a cuboidal piece of material having a convexly arched outer surface. The support pad blank may be cast or otherwise created in that shape. The grinding element is part of a CNC grinding machine, preferably a five-axis grinding machine such as ANCA's TX7+ universal grinder, which is capable of moving the grinding surface relatively to the support pad blank (when mounted in a workpiece holder) with five degrees of freedom.

Figure 7:
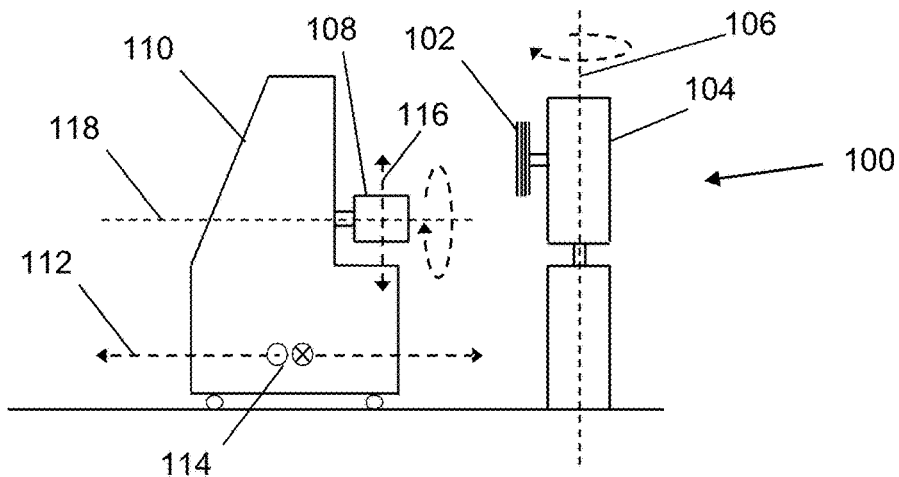
FIG. 7 is a schematic side view of a five-axis CNC grinding machine suitable for implementing the present invention.

A schematic drawing of a five axis CNC grinding machine 100 is shown in FIG. 7. The grinding machine 100 has a grinding element 102, which is mounted on a frame 104 that can pivot about a vertical axis 106. This enables the orientation of the grinding surface to be altered by one degree of freedom. A workpiece holder 108 is mounted on a carriage 110. The carriage can move backwards and forwards and side to side relative to the grinding element, as indicated by arrows 112, 114 respectively. The workpiece holder 108 can moved up and down on the carriage, as shown by arrow 116. Thus, the workpiece holder 108 has freedom of movement relative to the grinding element in three linear dimensions. The workpiece holder can also rotate about a horizontal axis 118.

In the invention, the CNC grinding machine can be instructed to move the grinding surface relative to the support pad blank in a single grinding operation to form at least the leading edge chamfer, leading transition and chamfered entering surface. The single grinding operation may also form the trailing transition region and the trailing edge chamfer.

The key to the invention is that the single grinding operation is not instructed on the basis of a complete CAD representation of the support blank, but rather is based on a skeleton of reference points (referred to herein as a virtual guide metric) between which the CNC grinding machine determines a path for the grinding surface. Generating a CAD drawing or model of a support pad with the continuously blended chamfers in a manner that provides future design flexibility, i.e. the ability to vary dimensions, etc., is impractical. The mathematical representation of the chamfered surface, especially in light of the convex nature of the front edge of the outer surface, is extremely complex and therefore difficult to code in software in a straightforward manner. The virtual guide metric, on the other hand, provides a means of parameterising the chamfered surface which allows variations in the angle or shape of the chamfer or in the size of the support pad itself.

FIG. 5 shows a schematic graphical depiction of a virtual guide metric 60 suitable for use with the invention. The virtual guide metric 60 is created in a CAD environment with respect to a CAD representation of a support pad blank 62. The virtual guide metric 60 defines a U-shaped curved guide path 64 and a plurality of control surfaces 66. The curved guide path 64 defines the route for the grinding surface to take around the top edge of the outer surface of the support pad blank 62. The U-shaped path thus effectively follows the line of the leading edge, front edge and trailing edge of the support pad blank 62. Each of the control surfaces 66 intersects the curved path 64 at an angle corresponding to the angle that should be exhibited by the chamfer at that point on the curved path 64. The curved path 64 lies on a planar profile 68, which is suspended by a predetermined distance above the outer surface of the support pad blank 62. The predetermined distance may be a selectable parameter of the virtual guide metric. It may be used by the CNC grinding machine to locate the grinding surface relative to the support pad blank before grinding occurs. Likewise, each control surface 66 may be defined in terms of its angle to the planar profile 62.

In the embodiment depicted in FIG. 5 there are nine control surfaces 66. More control surfaces can be used to give greater flexibility over the shape of the chamfer. This may be useful if different distributions of the frictional load on the entering surface are required.

The nine control surfaces include a run-in control surface 68 and run-off control surface 70 at the beginning and end of the U-shaped path 64 respectively. These surfaces ensure the grinding surface is properly aligned with the support pad blank as enters into contact and leaves the blank at the beginning and end of the grinding operation. The leading edge chamfer and the trailing edge chamfer typically comprise a chamfer of constant angle along the side of the support pad blank. The run-in and run-off control surfaces 68, 70 are at this angle. In order to create the leading edge chamfer and trailing edge chamfer, the virtual guide metric defines a leading edge terminal control surface 72 and a trailing edge terminal control surface 74, each having the angle of their respective chamfer. The run-in control surface 68 and the leading edge terminal control surface 72 thus provide a pair of control surfaces having the same angle. The grinding surface does not need to change orientation as it moves along the U-shaped path between the control surfaces, which means that a chamfer of constant angle is created even though the virtual guide metric does not define a graphical representation of such a surface. The same applied to the run-off control surface 70 and the trailing edge terminal control surface 74.

The leading edge terminal control surface 72 and the trailing edge terminal control surface 74 intersect with the U-shaped curved path 64 at the point where the path starts to curve around the front of the support pad blank 62. The radius of the curve may be a parameter of the virtual guide metric, which in turn may thus affect the position of the leading edge terminal control surface 72 and the trailing edge terminal control surface 74 and hence the length of the leading and trailing chamfers. The radius of the leading edge corner and the radius of the trailing edge corner may be independent parameters.

In this embodiment, there is a control surface located at the midpoint of the leading edge corner and trailing edge corner. The U-shaped path 62 includes entering surface portion between the leading edge corner and the trailing edge corner. This section corresponds to the chamfered entering surface. As this can be the most important part of the support pad in terms of the frictional forces it experience, the shape may need to be carefully controlled. In this embodiment three front control surfaces are provided on this section, e.g. one at the end of the leading edge corner, one at the end of the trailing edge corner and one located halfway between those two. These control surface enable the chamfered entering surface to be formed with a varying chamfer, e.g. in the form of a recessed portion located at the centre of the front surface (i.e. at the peak of the convex outer surface).

Upon receiving the parameters which make up the virtual guide metric the CNC grinding machine can plot a path for the grinding surface relative to the support pad blank (in the workpiece holder) using the control surfaces as reference points. The CNC grinding machine can be pre-programmed or instructed to vary the angle of the grinding surface between control surfaces in a constant manner. Essentially this means that there should be no discontinuity in the angle of the chamfer, which, if the angle varies between control surfaces with increasing distance x along the U-shaped path according to a continuous function φ(x), can be interpreted as requiring $$\frac{d\phi}{dx} = 0$$

at each control surface. The function φ(x) may be different between each pair of control surfaces. The CNC machine may have a library of functions to call on for this purpose. Normally these functions are called on when interpreting movements required to reproduce a given virtual surface. The invention bypasses the step of representing the surface graphically, instead replacing the surface more direct instructions for the grinding surface.

FIGS. 6A, 6B and 6C depict various parameters that can form part of the virtual guide metric. FIG. 6A is a longitudinal cross-sectional view down the centre of the support pad. FIG. 6B is a front view of the support pad. FIG. 6C is a plan view of the support pad.

FIG. 6A depicts four parameter: a primary lead angle 76 for defining the angle of orientation of the grinding surface along a central portion of the entering surface of the support pad blank; a primary lead width 78 for defining the width of the chamfer along the central portion of the entering surface; a secondary lead angle 80 for defining the angle of orientation of the grinding surface along the entering surface on each side of the central portion; and a secondary lead width 82 for defining the width of the chamfer along the entering surface on each side of the central portion. These parameters may thus influence the three front control surfaces.

FIG. 6B shows four further parameters: a pad leading side angle 84 for defining the angle of orientation of the grinding surface along the leading side surface of the support pad blank; a pad leading side angle width 86 for defining the width of the chamfer along the leading side surface of the support pad blank; a pad trailing side angle 88 for defining the angle of orientation of the grinding surface along the trailing side surface of the support pad blank; and a pad trailing side angle width 90 for defining the width of the chamfer along the leading side surface of the support pad blank. These parameters may thus influence the run-in control surface 68, the run-off control surface 70, the leading edge terminal control surface 72, and the trailing edge terminal control surface 74.

FIG. 6C shows two further parameters: a blend radius 92 for defining the radius of curvature of the curved path between a leading edge portion and an entering surface portion, and a support pad length 94 for defining the distance between the front of the support pad and the rear edge of the outer surface. The support pad length 94 may be optional. The blend radius 92 may influence the position of the leading edge terminal control surface 72 and the leading edge corner control surface.

The parameters discussed above are not essential to the virtual guide metric. Rather they represent an efficient shorthand way of adapting the virtual guide metric to meet different sizes and shapes of support pad.

Figure 8:
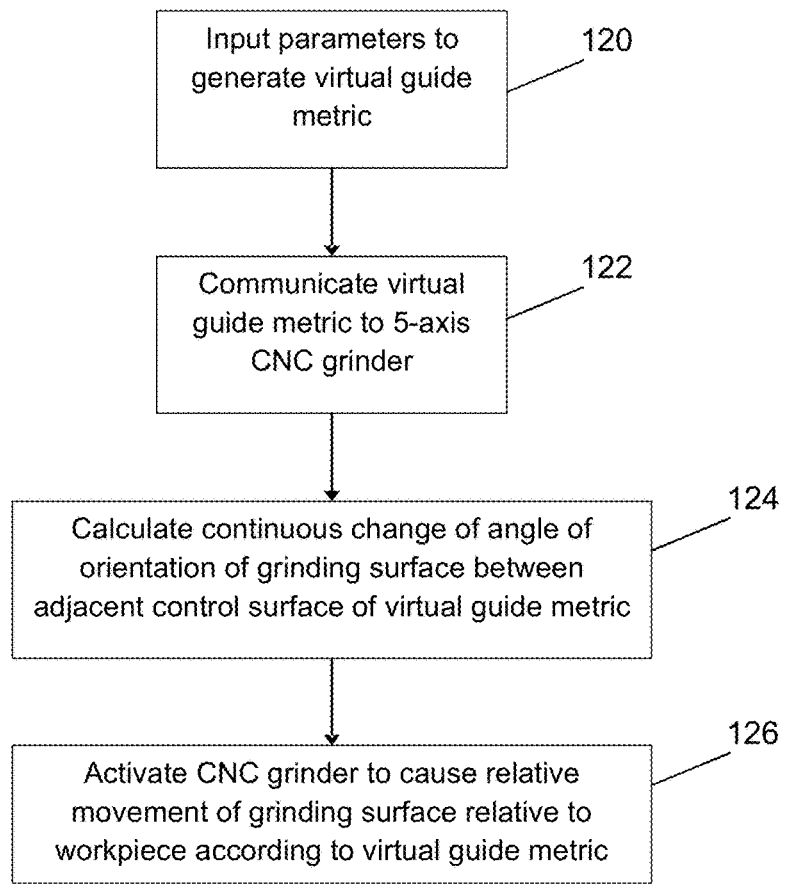
FIG. 8 is a flow chart showing a method that is an embodiment of the invention.

FIG. 8 summarizes the steps of a manufacturing technique that is an embodiment of the invention. A first step 120 comprises inputting parameters in order to generate the virtual guide metric. This step may encompass drawing the virtual guide metric within a CAD environment, or it may comprise inputting data corresponding to the parameters discussed above to a system that can generate the virtual guide metric from those parameters.

A second step 122 comprises communicating the virtual guide metric to the CNC grinding machine. This may be done in any conventional manner, similar to the way in which CAD drawings are communicated in a CAM environment.

A third step 124 comprises calculating, in the CNC grinding machine, the relative movement of the grinding surface relative to the workpiece holder in accordance with the virtual guide metric. This step may include calculating a function which changes the angle of the grinding surface varies between adjacent control surfaces in a continuous manner. Given the parameters defining the virtual guide metric, conventional CNC grinding machines are capable of performing (e.g. can be programmed to perform) such calculations according to known techniques.

A fourth step 126 comprises activating the CNC grinding machine to perform the calculated relative movement in order to manufacture the support pad.

The invention claimed is:

1. A method of manufacturing a support pad for the drill head of a deep hole drilling machine, the method comprising the steps of:
    generating a virtual guide metric, the virtual guide metric including a curved path for defining a direction of travel of a grinding surface around a leading side surface and front surface of a support pad blank and a plurality of control surfaces intersecting with the path at separate discrete locations along its length, each control surface defining an angle of orientation of the grinding surface at each discrete location on the path;
    instructing a computer numerical control (CNC) grinding machine to associate the virtual guide metric with a support pad blank held in a workpiece holder of the CNC grinding machine;
    causing relative movement between a grinding surface of the CNC grinding machine and the support pad blank held in the workpiece holder according to the virtual guide metric; and
    during the relative movement, changing the angle of orientation of the grinding surface between adjacent control surfaces in a continuous manner.

2. A method according to claim 1, wherein the curved path comprises a U-shaped path for forming a single chamfered surface around a leading side surface, a front surface and a trailing surface of the support pad blank.

3. A method according to claim 1, wherein the support pad blank includes an outer surface following a convex arch between opposite side edges thereof, and wherein the curved path includes an arched portion for following the shape of the outer surface at its leading edge.

4. A method according to claim 1, wherein changing the angle of orientation of the grinding surface includes varying the angle of orientation as the grinding surface travels along a distance between terminal end points of adjacent control surfaces according to a continuous function $\phi(x)$, where $d\phi/dx=0$ at each terminal end point.

5. A method according to claim 1, wherein the virtual guide metric includes a plurality of parameters stored in a computer memory, the parameters defining properties of the curved path and plurality of control surfaces.

6. A method according to claim 5, wherein the plurality of parameters include any one or more from the group of: a primary lead angle for defining the angle of orientation of the grinding surface along a central portion of the entering surface of the support pad blank; a primary lead width for defining the width of the chamfer along the central portion of the entering surface; a secondary lead angle for defining the angle of orientation of the grinding surface along the entering surface on each side of the central portion; a secondary lead width for defining the width of the chamfer along the entering surface on each side of the central portion; a pad leading side angle for defining the angle of orientation of the grinding surface along the leading side surface of the support pad blank; a pad leading side angle width for defining the width of the chamfer along the leading side surface of the support pad blank;
    a pad trailing side angle for defining the angle of orientation of the grinding surface along the trailing side surface of the support pad blank; a pad trailing side angle width for defining the width of the chamfer along the leading side surface of the support pad blank; and a blend radius for defining the radius of curvature of the curved path between a leading edge portion and an entering surface portion.

7. A method according to claim 5, further comprising the step of, before generating the virtual guide metric, inputting one or more of the plurality of parameters into the computer memory.

8. A method of applying a surface profile to an object, the method comprising the steps of:
    generating a virtual guide metric, the virtual guide metric including a path for defining the direction of travel of a grinding surface along the perimeter of the object; a plurality of control surfaces intersecting with the path at separate discrete locations along its length, each control surface defining an angle of orientation of the grinding surface at each discrete location on the path;
    instructing a computer numerical control grinding machine to associate the virtual guide metric with the object when held in a workpiece holder of the computer numerical control grinding machine;
    causing relative movement between a grinding surface of the computer numerical control grinding machine and the object held in the workpiece holder according to the virtual guide metric; and
    during the relative movement, changing the angle of orientation of the grinding surface between adjacent control surfaces in a continuous manner.

* * * * *